United States Patent
Naiki et al.

[19]

[11] Patent Number: 6,038,353
[45] Date of Patent: *Mar. 14, 2000

[54] LIGHT BEAM SCANNING OPTICAL APPARATUS

[75] Inventors: Toshio Naiki; Kenji Takeshita; Hidenari Tachibe; Hiroki Kinoshita, all of Toyokawa, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/219,516

[22] Filed: Dec. 23, 1998

[30] Foreign Application Priority Data

Dec. 26, 1997 [JP] Japan .................................. 9-361215

[51] Int. Cl.$^7$ ................................ G06K 9/20; H04N 1/04
[52] U.S. Cl. ...................... 382/312; 369/44.13; 358/475; 358/480; 358/481
[58] Field of Search ..................... 358/474, 475, 358/476, 480, 481, 486, 493, 494; 382/312, 321; 250/235, 234; 359/17, 19, 35, 127, 254, 298, 299, 302, 379, 383, 391, 416, 417, 418, 440, 604

[56] References Cited

U.S. PATENT DOCUMENTS

| 4,980,549 | 12/1990 | Baldwin | 250/235 |
| 5,068,843 | 11/1991 | Takeshita | 369/44.13 |
| 5,367,399 | 11/1994 | Krammer | 359/206 |
| 5,783,818 | 7/1998 | Manabe et al. | 250/239 |
| 5,845,981 | 12/1998 | Bradley | 353/31 |
| 5,883,385 | 3/1999 | Takahashi | 250/235 |
| 5,953,294 | 9/1999 | Choi | 369/44.12 |

FOREIGN PATENT DOCUMENTS 6-50012  7/1994  Japan .

*Primary Examiner*—Jerome Grant, II
*Attorney, Agent, or Firm*—Burns, Doane, Swecker & Mathis, LLP

[57] ABSTRACT

A light beam scanning optical apparatus which writes two lines at one scan on a photosensitive member with light beams emitted from laser diodes. The light beams are combined at a beam splitter. The beam splitter is supported on a surface including a semitransparent layer by total three balls provided on a base block.

20 Claims, 16 Drawing Sheets

| FLUCTUATION OF BEAM SPLITTER | RELATIVE SHIFT OF TWO BEAMS ON IMAGING SURFACE |
|---|---|
| ΔX | ΔZ' |
| ΔY | NO INFLUENCE |
| Δθz | ΔY' | n: DIRECTION OF OPTICAL AXIS
t: MAIN SCANNING DIRECTION
Y: SUB-SCANNING DIRECTION

LIGHT BEAM SCANNING OPTICAL APPARATUS

This application is based on application Ser. No. 9-361215 filed in Japan, the contents of which are hereby incorporated by reference.

BACKGROUND OF THE INVENTION

1. Field of the Invention

The present invention relates to a light beam scanning optical apparatus, and in particular, to a light beam scanning optical apparatus to be used as image writing means of a laser printer, a digital copying machine or the like.

2. Description of Related Arts

Conventionally, a variety of light beam scanning optical apparatuses have been known as means for writing an image onto a photosensitive member. In those apparatuses, a light beam emitted from a light source unit is scanned as deflected by a polygon mirror and focused on a photosensitive member via an fθ-lens or the like.

In recent years, there have been growing demands for increasing the pixel density and increasing the image writing velocity. In compliance with these demands, there has been developed a multi-beam type optical apparatus in which two light sources are provided and light beams emitted from the respective light sources are scanned as deflected in a state in which they are close to each other in a sub-scanning direction so as to write two lines at one scan.

FIG. 14a is a schematic view of a multi-beam scanning optical apparatus which was experimentally produced by the inventors of the present invention. Light beams $B_1$ and $B_2$ emitted from laser diodes 2 and 3, which are light sources, are coupled by a beam splitter 4 formed by bonding two prisms via a semitransparent layer 4c so that the light beams $B_1$ and $B_2$ travel in the same direction (direction X). Then, the light beams $B_1$ and $B_2$ are focused on a photosensitive member (imaging surface) via a lens system. Although the light beams $B_1$ and $B_2$ are shown as one line in the figure, they travel close to each other at an interval of several tens of microns in the sub-scanning direction (direction Z).

However, in the optical apparatus shown in FIG. 14a, since the beam splitter 4 is placed on and bonded to a supporting base 100 horizontally, there is a possibility that the position of the beam splitter 4 may fluctuate in the direction of the optical axis X, in the main scanning direction Y or in the sub-scanning direction Z. If the beam splitter 4 fluctuates in the direction of the optical axis X, the light beam $B_2$, which is emitted from the laser diode 3 and deflected by the semitransparent layer 4c, shifts by $\Delta Z'$ on the imaging surface in the sub-scanning direction. In the same way, if the beam splitter 4 rotationally fluctuates on Z-axis, the light beam $B_2$ shifts by $\Delta Y'$ on the imaging surface in the main scanning direction.

SUMMARY OF THE INVENTION

Accordingly, an object of the present invention is to provide a light beam scanning optical apparatus where if an optical element for coupling a plurality of light beams fluctuates in position on a supporting member, the relative positions of image points of the light beams do not change.

In order to achieve the above object, the present invention provides a light beam scanning optical apparatus where an optical element having an optical functional surface, which may include an optical thin layer, a semitransparent layer, or the like is positioned and supported on a plane surface including the optical functional surface on a supporting member; the optical element leads light beams emitted from a plurality of light sources and incident from various directions to emerge therefrom at a specified interval in the sub-scanning direction.

Since the optical element is positioned on the plane surface including the optical functional surface on the supporting member, even if the position of the optical element fluctuates on the supporting member, the optical functional surface is kept on the same level. That is, the angle of the functional surface against the light beams incident from various directions is always definite despite of the positional fluctuation of the optical element; thus, the image points of the light beams on the imaging surface can keep the specified positional relation.

In the light beam scanning optical apparatus of the present invention, it is preferable to provide a gap between the bottom portion of the optical element and the supporting member. The reason is that if the position of the optical element fluctuates and its bottom portion touches the supporting member, the optical element may lean and the angle of reflection of the light beam changes, which result in a shift of the image point. Thus, with the gap provided in-between, such a shift of the image point will be avoided.

Further, in the light beam scanning optical apparatus of the present invention, the optical element comprises two isosceles-triangle pole prisms of different length integrated together on their bottom faces at the optical functional surface where the bottom face of the longer prism projects from the both ends of the shorter prism. For such an optical element, it is preferable to provide a total of three projections to the supporting member so as to hold the projecting bottom face of the optical element at one point on one side and at two points on the other side. This is because the three-point suspension is the most stable supporting construction. Furthermore, by urging the optical element elastically in the direction perpendicular to the projecting bottom face and retaining it on the supporting member, the optical element can be retained on the supporting member in further stable condition.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Preferred embodiments of the light beam scanning optical apparatus of the present invention will be descried below with reference to the accompanying drawings.

Figure 1:
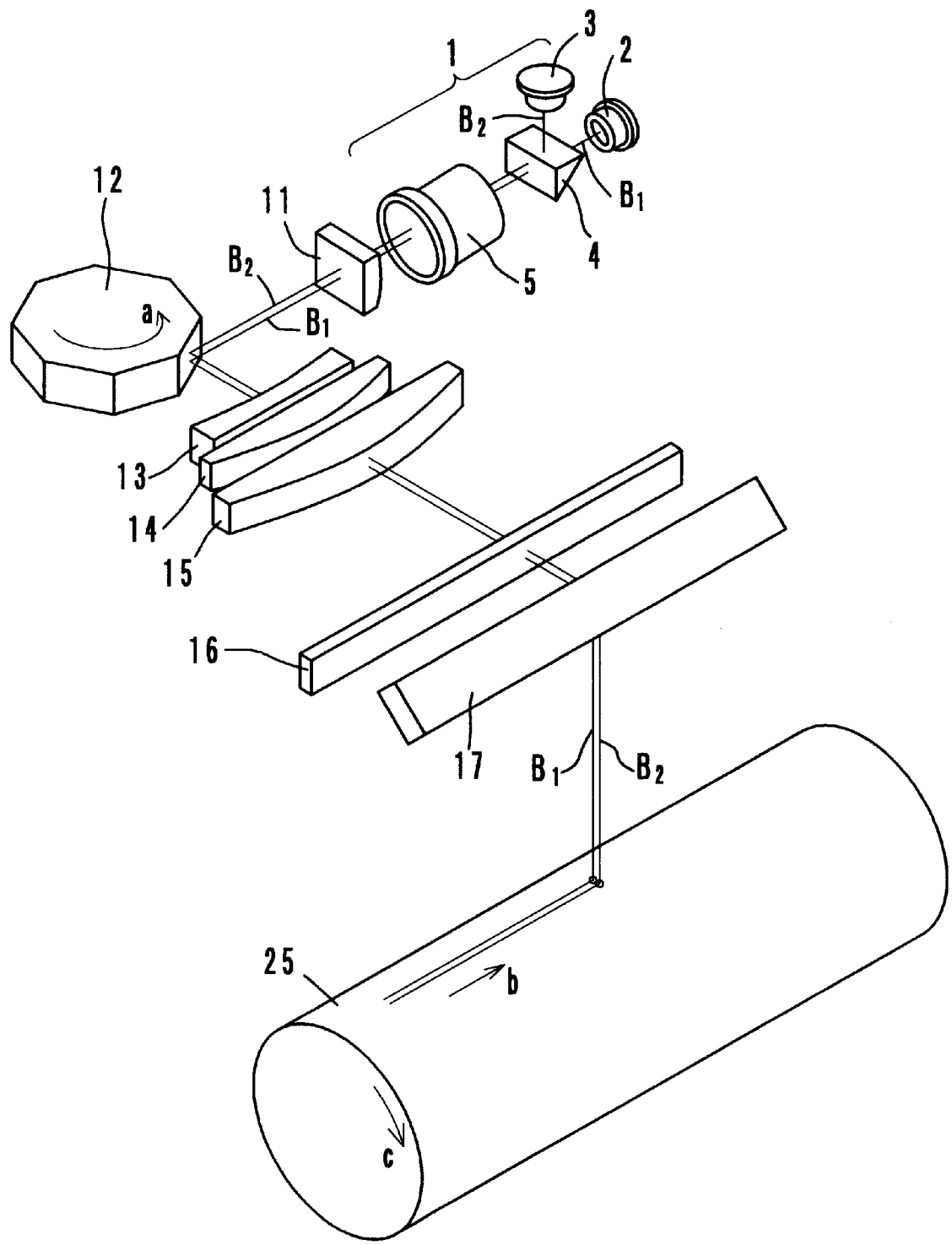
FIG. 1 is a perspective view showing a schematic construction of a light beam scanning optical apparatus according to an embodiment of the present invention.
Figure 2:
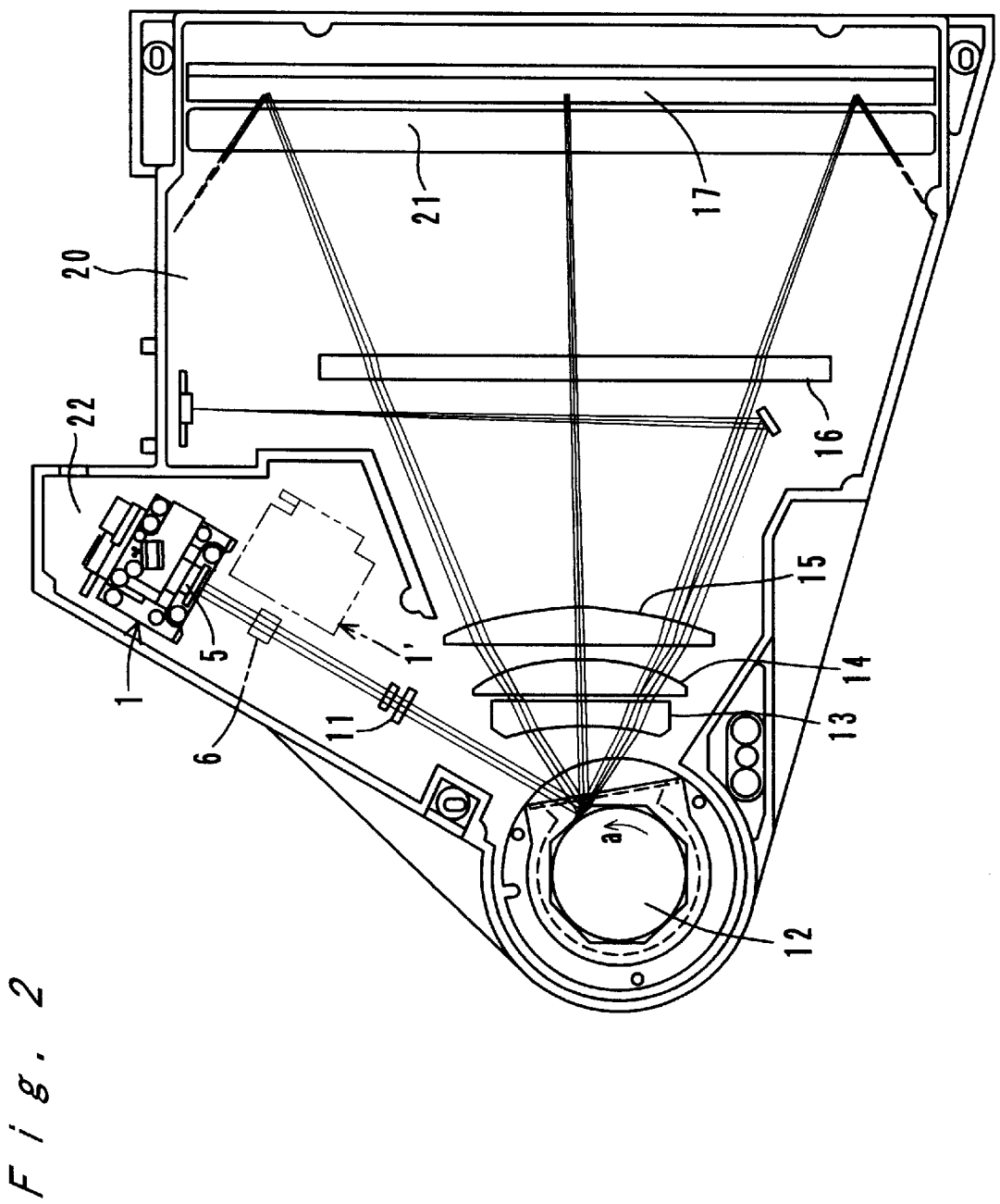
FIG. 2 is a plan view of the above light beam scanning optical apparatus.
Figure 3:
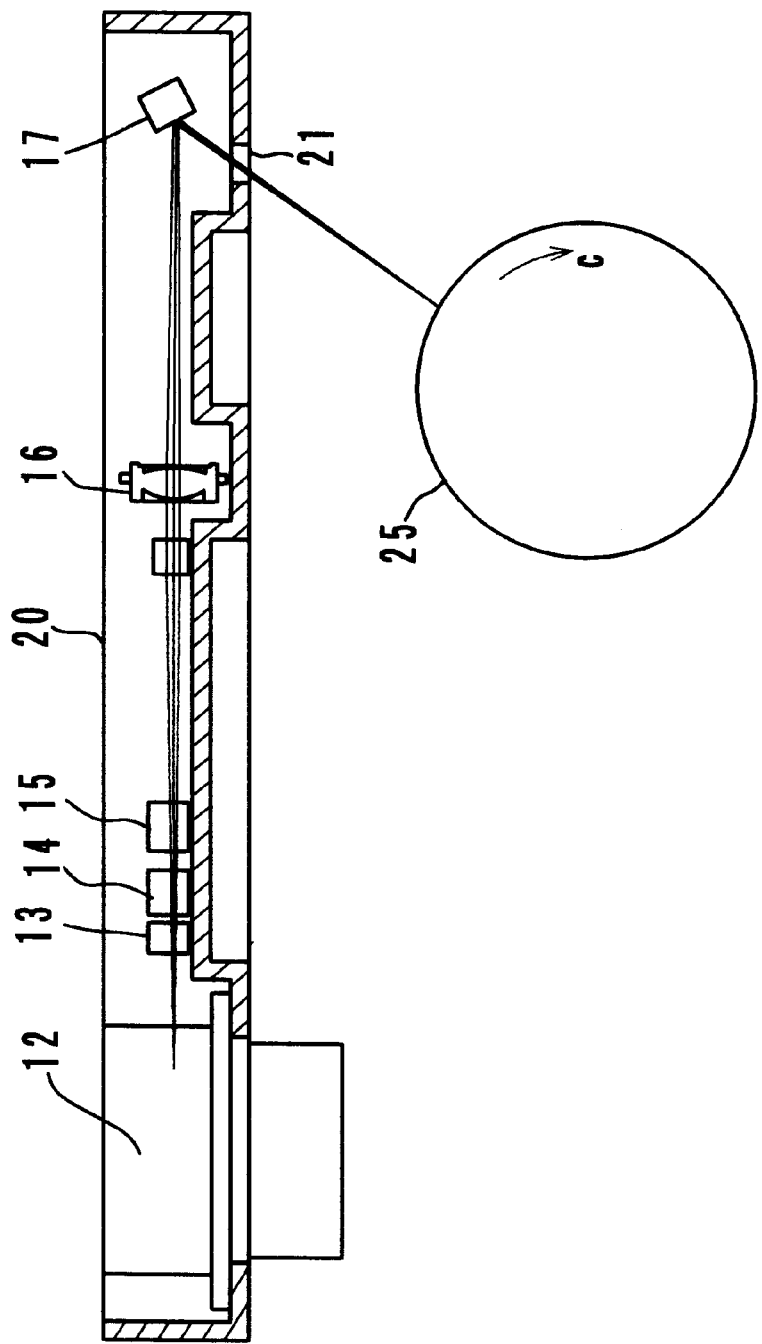
FIG. 3 is a vertical sectional view of the above light beam scanning optical apparatus.

As shown in FIGS. 1 through 3, a light beam scanning optical apparatus is approximately constructed of a light source unit 1, a cylindrical lens 11, a polygon mirror 12, three fθ-lenses 13, 14 and 15, a cylindrical lens 16, a plane mirror 17 and a housing 20 which houses therein these optical members.

The light source unit 1 is constructed of first and second laser diodes 2 and 3 which emit light beams $B_1$ and $B_2$ respectively in mutually perpendicular directions, a beam splitter 4 formed by bonding two prisms via a semitransparent layer and a collimator lens 5. The light beam $B_1$ emitted from the first laser diode 2 travels straight through the semitransparent layer of the beam splitter 4 and is formed into a parallel bundle of rays (or a convergent bundle of rays) by the collimator lens 5. The light beam $B_2$ emitted from the second laser diode 3 is reflected at an angle of 90° by the semitransparent layer of the beam splitter 4 and is formed into a parallel bundle of rays (or a convergent bundle of rays) by the collimator lens 5.

The light beams $B_1$ and $B_2$ are directed to travel in an identical direction by the beam splitter 4, and they travel close to each other at an interval of several tens of microns in the sub-scanning direction. For example, in a case the printing density is 400 dpi, the interval between the light beams $B_1$ and $B_2$ on the imaging surface is 63.5 μm; and 600 dpi, 42.3 μm.

The light beams $B_1$ and $B_2$ emergent from the collimator lens 5 reach the polygon mirror 12 via the cylindrical lens 11. The cylindrical lens 11 converges each of the light beams $B_1$ and $B_2$ in a linear form elongated in the main scanning direction on a place in the vicinity of a reflecting surface of the polygon mirror 12. The polygon mirror 12 is rotatively driven at a constant angular velocity in the direction of arrow "a". The light beams $B_1$ and $B_2$ are scanned as deflected at a constant angular velocity on each reflecting surface based on the rotation of the polygon mirror 12, made to pass through the fθ-lenses 13, 14 and 15 and the cylindrical lens 16, and then reflected on the plane mirror 17 to travel downward. Subsequently, the light beams $B_1$ and $B_2$ are made to pass through a slit 21 of the housing 20 and focused on a photosensitive drum 25 as scanned in the direction of arrow "b". Thus, two lines are simultaneously written at one scan in this optical system.

The fθ-lenses 13, 14 and 15 have a function of correcting the main scanning velocities of the light beams $B_1$ and $B_2$ deflected at a constant angular velocity by the polygon mirror 12 to a constant velocity on the photosensitive drum 25, namely, correcting distortion. The cylindrical lens 16 has a power only in the sub-scanning direction similarly to the aforementioned cylindrical lens 11, and the two lenses 11 and 16 cooperate to correct an error of perpendicularity of the reflecting surfaces of the polygon mirror 12.

The photosensitive drum 25 is driven at a constant velocity in the direction of arrow "c", so that an image (electrostatic latent image) is written on the photosensitive drum 25 by the main scanning in the direction of arrow "b" made by the polygon mirror 12 and the fθ-lenses 13, 14 and 15 and the sub-scanning in the direction of arrow "c" made by the rotation of the photosensitive drum 25.

(Structure of light source unit)

Figure 4:
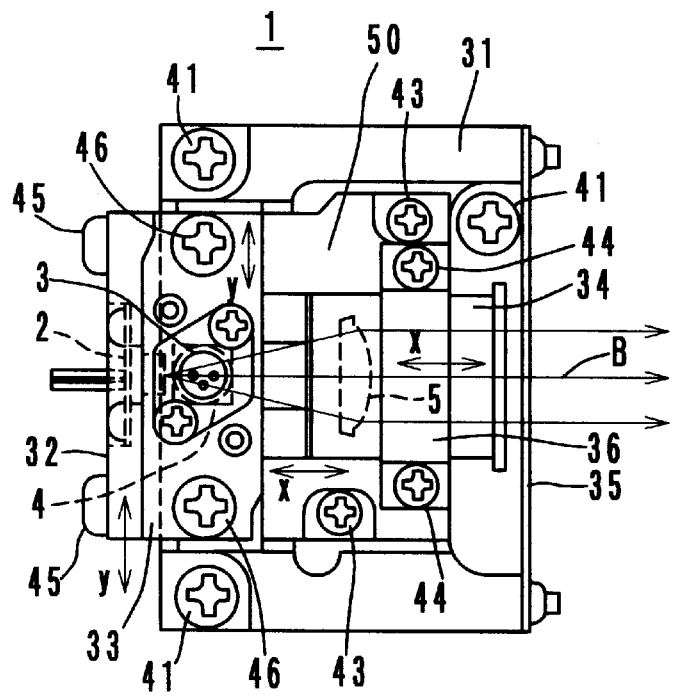
FIG. 4 is a plan view showing an example of the assembly structure of a light source device according to the present invention.
Figure 5:
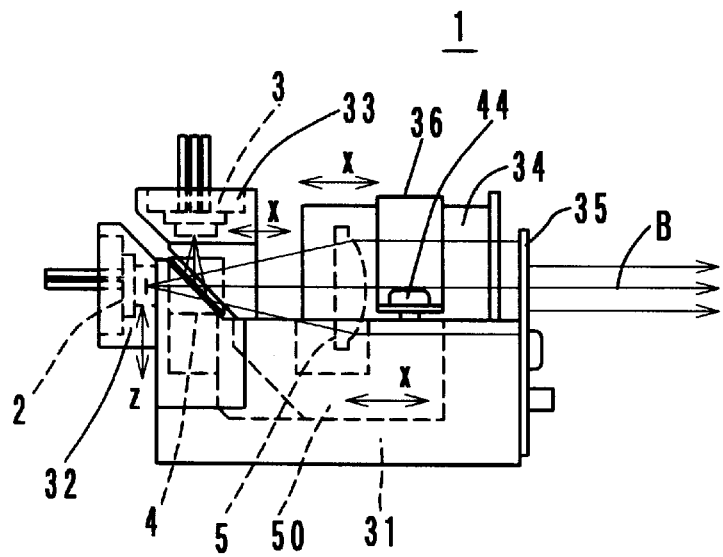
FIG. 5 is a front view of FIG. 4.
Figure 8:
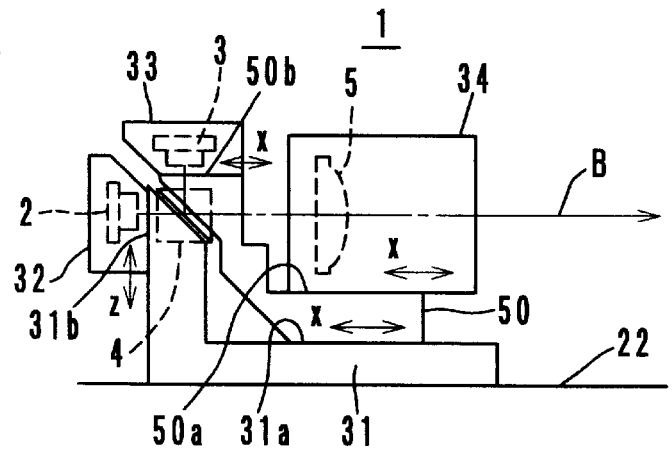
FIG. 8 is a schematic view of the above assembly structure.
Figure 9:
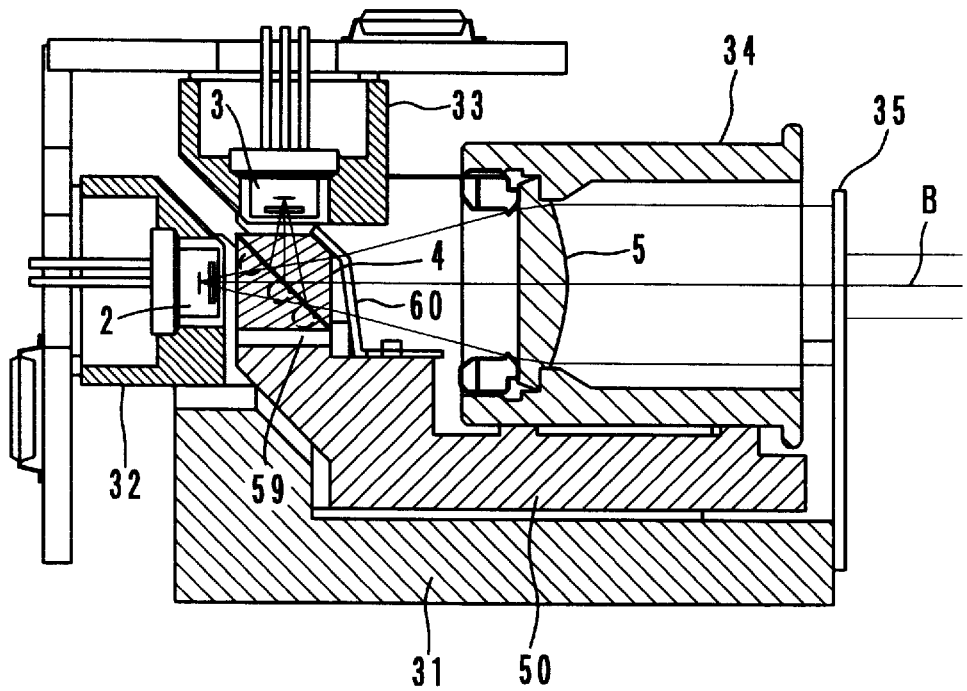
FIG. 9 is a sectional view of the above assembly structure.

Next, the assembly structure of the light source unit 1 will be described with reference to FIGS. 4 through 9. FIGS. 4 though 7 show the light source unit 1 in various directions, FIG. 8 shows the structure schematically, and FIG. 9 shows the cross section; for simplicity of explanation, the structure will be described mainly with reference to FIG. 8. It is to be noted that an x-direction is a direction parallel to an optical axis B of light emergent from the beam splitter 4, a y-direction is a direction perpendicular to the x-direction in a horizontal plane, and a z-direction is a direction perpendicular to the x- and y-directions.

Figure 6:
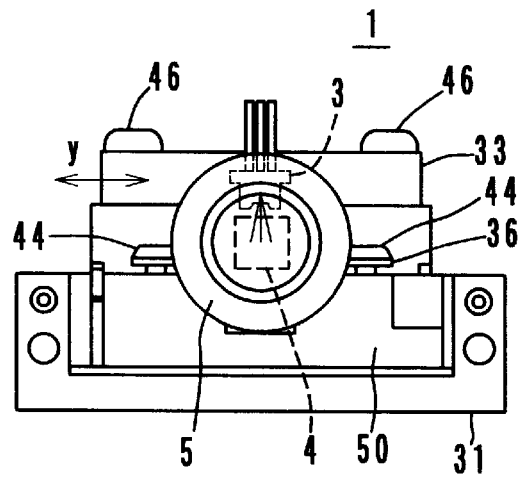
FIG. 6 is a right side view of FIG. 5.
Figure 7:
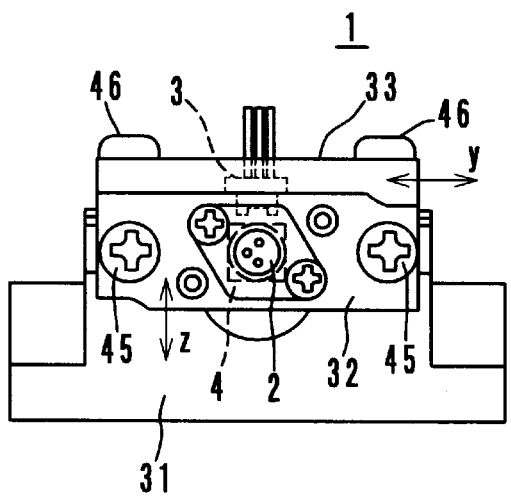
FIG. 7 is a left side view of FIG. 5.

This assembly structure of the light source unit is comprised of base blocks 31 and 50, a first movable retainer block 32 for retaining the first laser diode 2, a second movable retainer block 33 for retaining the second laser diode 3, a lens barrel 34 for retaining the collimator lens 5 and a slit plate 35 (not shown in FIG. 6). The base block 31 is fixed by screws 41 on a horizontal reference surface (floor surface) 22 of the housing 20.

The base block 50 retains the beam splitter 4 in a way explained below, and it is mounted by screws 43 on a surface 31a parallel to the optical axis B of the base block 31 as adjustable in position in the x-direction. The lens barrel 34 is mounted as fastened by a plate belt 36 on a surface 50a parallel to the optical axis B of this base block 50 as adjustable in position in the x-direction. The plate belt 36 is fixed at its both end portions by screws 44 on the base block 50. It is to be noted that the surface 50a retaining the lens barrel 34 is a V-shaped groove extending in parallel with the optical axis B although not shown.

The first movable retainer block 32 is mounted by screws 45 on a surface 31b perpendicular to the optical axis B of the base block 31 as adjustable in position in the y- and z-directions. The second movable retainer block 33 is mounted by screws 46 on a surface 50b parallel to the optical axis B of the base block 50 as adjustable in position in the x- and y-directions.

An assembling method and an adjusting method of the assembly structure having the above construction will be now described.

In a state in which the lens barrel 34 is temporarily fixed by the plate belt 36 and the screws 44 on the base block 50 to which the beam splitter 4 is fixed, the base block 50 is temporarily fixed by the screws 43 on the base block 31. Further, the first and second movable retainer blocks 32 and 33 are temporarily fixed by screws 45 and 46 on the base blocks 31 and 50, respectively.

The positional adjustment is executed in the following way. First, the screws 43 are loosened, and the base block 50 is moved linearly in the x-direction within a range of clearance between the screws 43 and their mounting holes and is fixed on the base block 31. Thereby, the collimator lens 5 is positioned with respect to the virtual optical axis B. Next, the screws 44 are loosened, and the lens barrel 34 is positioned in the x-direction, thereby executing focus adjustment. Further, the screws 45 are loosened, and the first movable retainer block 32 is moved two-dimensionally in the y- and z-directions within a range of clearance between the screws 45 and their mounting holes. Thereby, the light beam emitting position of the first laser diode 2 is determined.

The above adjustment work is carried out on a special adjusting jig, and the light source unit 1 in this state is assembled into the housing 20 in which other optical members have been assembled. Specifically, the base block 31 is fixed on the horizontal reference surface 22 of the housing 20 by the screws 41. Subsequently, the screws 46 are loosened, and the second movable retainer block 33 is moved two-dimensionally in the x- and y-directions within a range of clearance between the screws 46 and their mounting holes. Thereby, the light beam emitting position of the second laser diode 3 is determined.

The housing 20 is covered with a lid member (not shown) after the completion of the aforementioned adjustment work.
(Structure and supporting construction of the beam splitter)

Figure 10:
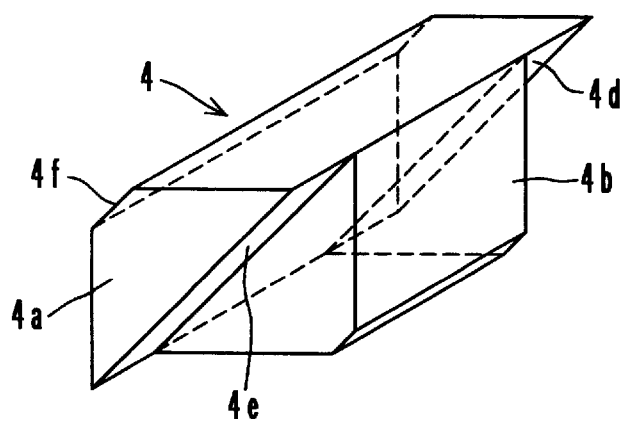
FIG. 10 is a perspective view of a beam splitter.

The beam splitter 4, as shown in FIG. 10, comprises two isosceles-triangle pole prisms 4a and 4b of different length which are bonded together on their bottom faces at an optical thin layer, where as denoted by 4d and 4e, the bottom face of the longer prism 4a projects from the both ends of the shorter prism 4b.

Figure 11:
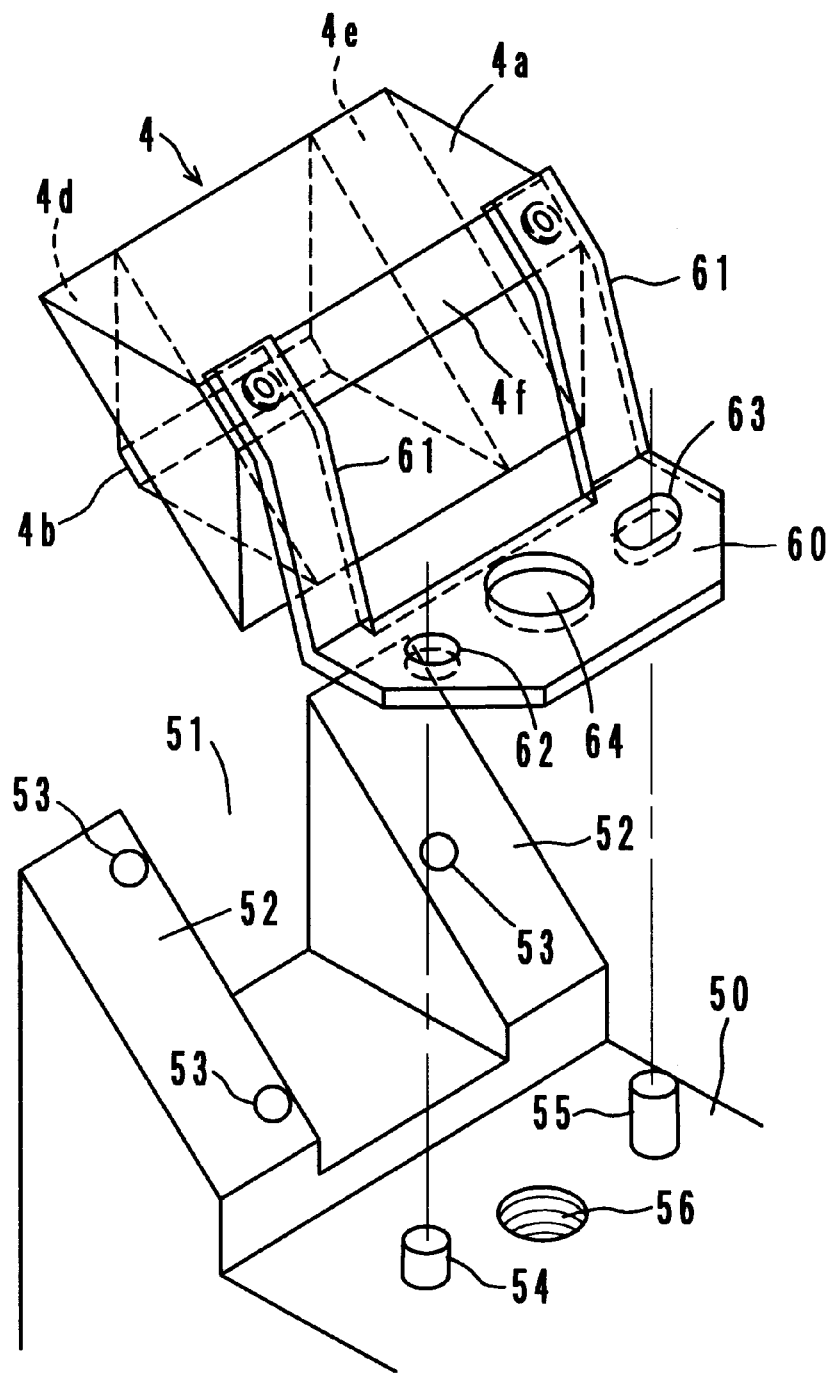
FIG. 11 is a fragmentary perspective view showing the assembly structure of the beam splitter.

The base block 50, as shown in FIG. 11, comprises a recess portion 51 in which the beam splitter 4 is placed and positioning planes 52 which are provided on both sides of the recess portion 51. On the positioning plane 52 on this side of FIG. 11, two balls 53 are plugged into halfway, and on the positioning plane 52 on the far side, one ball 53 is plugged into halfway. Being pressed elastically by the end parts of two arms 61 of a plate spring 60, the beam splitter 4 is retained on the base block 50 in a state in which the projecting portions 4d and 4e of the bottom face are in contact with the balls 53. The plate spring 60 is fixed on the base block 50 in a way that holes 62 and 63 of the plate spring 60 are engaged into projections 54 and 55 on the base block 50, and a screw (not shown) is tightened into a tapped hole 56 through a mounting hole 64. Since the hole 63 has a slight clearance against the projection 55, the positioning of the plate spring 60 is fine-adjustable. The end parts of the arms 61 of the plate spring 60 press the top surface 4f of the beam splitter 4 with minute projections, and further a silicone rubber is provided in-between so as to cause adhesion and elasticity between them.

As explained above, with three-point suspension of the bottom face 4d and 4e by three balls 53, the beam splitter 4 is supported stably. Also, since the plate spring 60 is urged elastically by its arms 61 toward the beam splitter 4 in the direction perpendicular to the bottom face 4d and 4e, the beam splitter 4 is retained further stably on the base block 50. There is a gap 59 between the bottom face of the beam splitter 4 and the floor of the recess portion 51 (see FIG. 9). On account of the gap 59, even if the beam splitter 4 shifts a little downward, it will not touch the base block 50 to fluctuate its setting angle.

Although the balls 53 made of metal are engaged into holes formed on the positioning planes 52 in this embodiment, the material for the balls 53 is optional, and it is acceptable to form projections on the positioning planes 52 as one with the base block 50. It is also acceptable to support the beam splitter 4 by the positioning planes 52 themselves instead of three-point suspension. In this case, the projecting portions 4d and 4e of the bottom face are bonded to the positioning planes 52. Therefore, it does not necessarily need to urge the beam splitter 4 elastically by the plate spring 60.

Further, it is possible to make the top surface 4f a roughened surface so as to increase the frictional resistance against the arms 61 of the plate spring 60; thereby, the beam splitter 4 is prevented from coming out of position or falling because of an impact or the like to the utmost.
(Relative shifts of image points)

Figure 12:
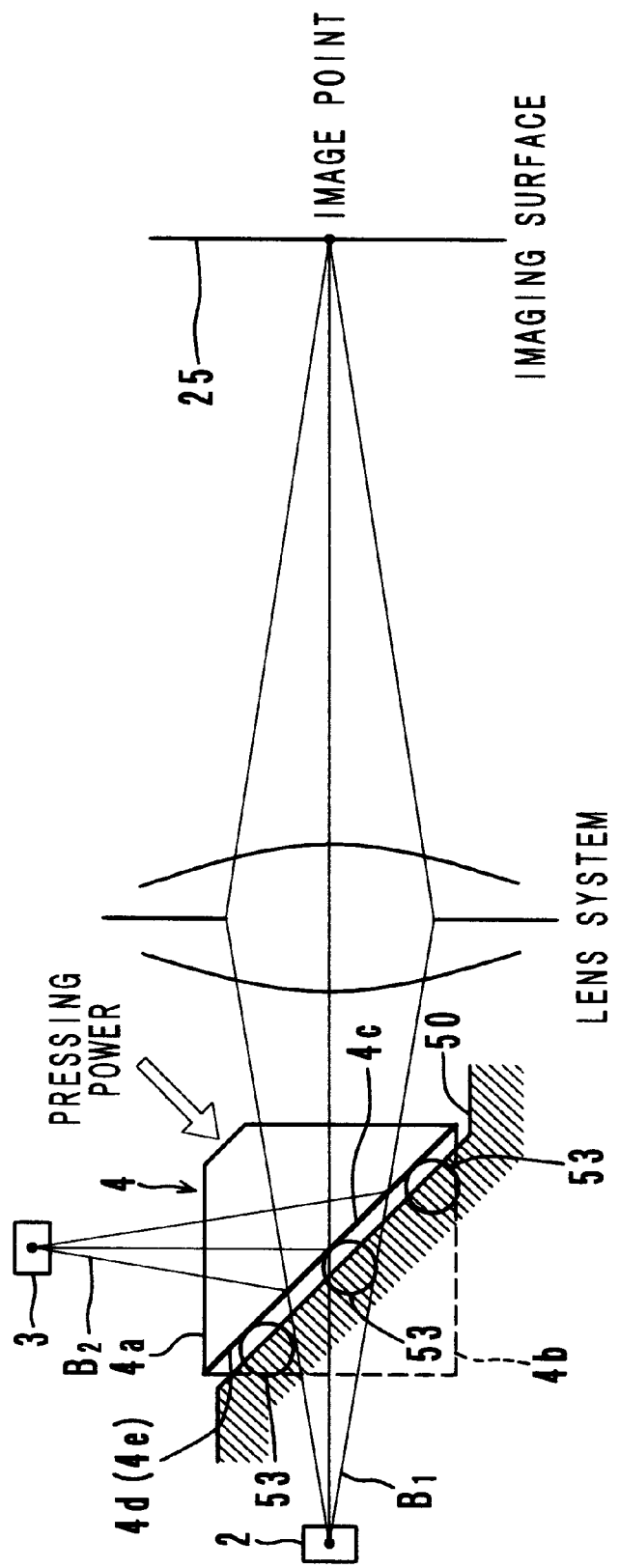
FIG. 12 is a schematic view showing optical paths of light beams in the embodiment.
Figures 13A, 13B:
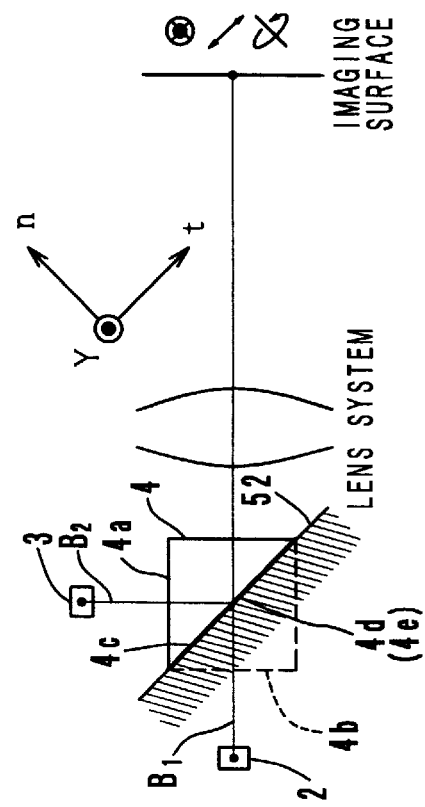
FIGS. 13a and 13b are illustrations showing shifts of image points of light beams in an example of the present invention.
Figures 14A, 14B:
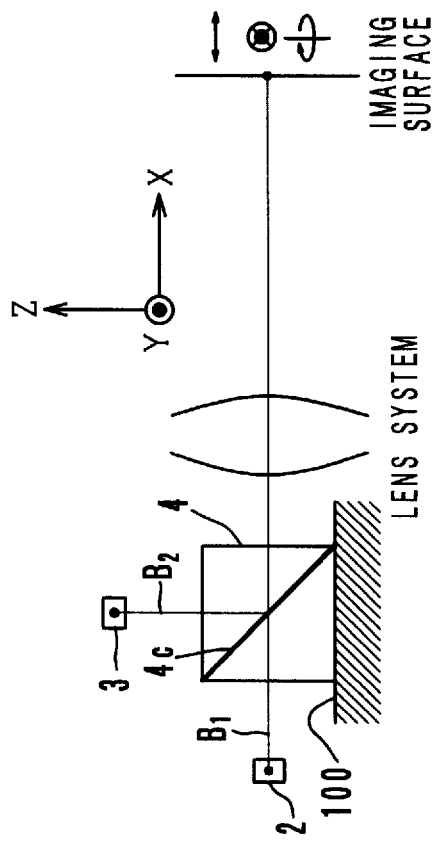
FIGS. 14a and 14b are illustrations showing shifts of image points of light beams in a prior art.

FIGS. 12 and 13a show optical paths schematically in the light beam scanning optical apparatus of the present embodiment. The light beam $B_1$ emitted from the laser diode 2 travels through the semitransparent layer 4c and is imaged on an image point. The light beam $B_2$ emitted from the laser diode 3 is reflected on the semitransparent layer 4c and is imaged on an image point. Although the image points are drawn as one point, they actually have a pitch of 63.5 μm at 400 dpi and 42.3 μm at 600 dpi in the sub-scanning direction Z. As aforementioned, if the setting angle of the semitransparent layer 4c changes, the image point of the reflected light beam $B_2$ shifts; and accordingly, the relative positions of the two light beams on the imaging surface will shift by ΔZ' or ΔY' (see FIGS. 14a and 14b).

In this embodiment, as shown in FIGS. 13a and 13b, there is a possibility that the position of the beam splitter 4 on the base block 50 may shift in the main scanning direction Y and the direction "t" parallel to the semitransparent layer 4c and rotate on the normal direction "n" of the semitransparent layer 4c. However, even if the beam splitter 4 shifts or rotates in any direction, the shifts or rotation ΔY, Δt or Δθn do not affect the setting angle of the semitransparent layer 4c; therefore, the relative positions of the light beams $B_1$ and $B_2$ on the photosensitive drum 25 (imaging surface) do not change.
(Mounting structure of base block)

A mounting structure of the base block 31 on the floor surface (horizontal reference surface) 22 of the housing 20 will be described.

It is needed that the base block 31 is mounted elastically on the housing 20. This is accomplished by providing an elastic member between the base block 31 and the screws 41 or making a part of the base block 31 have elasticity. Also, the pressing power to mount the base block 31, which is fastening power of the screws 41, needs to be such a value that does not cause dislocation of the laser diodes 2 and 3 which are mounted on the base block 31 via the retainer blocks 32 and 33. Further, it is preferable to suspend the base block 31 at three points with three projections on the housing 20.

As a method of fixing the light source unit 1 on the housing 20, screwing is generally employed, as used in this embodiment (screws 41). The light source unit 1 is assembled into the housing 20 after the adjustment process of the light axes of the laser diodes 2 and 3 and the collimator lens 5, which is carried out separately from the housing 20. At the time of assembling, the bearing surface must agree within the tolerance with that at the time of adjusting; otherwise, when the screws 41 are tightened, there arise distortion on the base block 31 and a slight change in positional relation between the laser diodes 2 and 3 and the collimator lens 5, which cause a shift of the image point. However, such agreement of the bearing surface within the tolerance at the times of adjusting and assembling is practically impossible, and the shift of the image point is small enough as against the allowable range of error in the lens/mirror system; thus, such disagreement has not been considered as a problem. However, in a light beam scanning optical apparatus of a multi-beam scanning type, which is capable of writing an image on a photosensitive member using a plurality of light beams, the shift of the image point is found as a change of relative positions of the light beams on the imageing surface. In the multi-beam method, it is required that the interval between light beams is adjusted in several tens of microns, and a shift of the image point is controlled in several microns.

Therefore, it is needed that pressing to screw the base block 31 down to the housing 20 is carried out elastically, and the pressing power is limited within such a range as not to distort the base block 31. Thus, when the light source unit 1 is assembled in the housing 20, distortion of the base block 31 will be avoided, and a change of the relative positions of the image points of the light beams $B_1$ and $B_2$ will be prevented. Also, by providing an elastic member between the base block 31 and the screws 41 or making a part of the base block 31 have elasticity, dislocation caused by a change in circumstance temperature or a stress relief between components of the light source unit 1 can be absorbed elastically so as to prevent relative shifts of the image points of the light beams $B_1$ and $B_2$.

Figure 15:
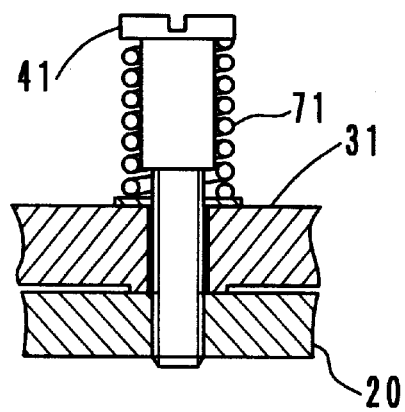
FIG. 15 is a sectional view showing an example of the assembly structure of a base block to a housing.
Figure 16:
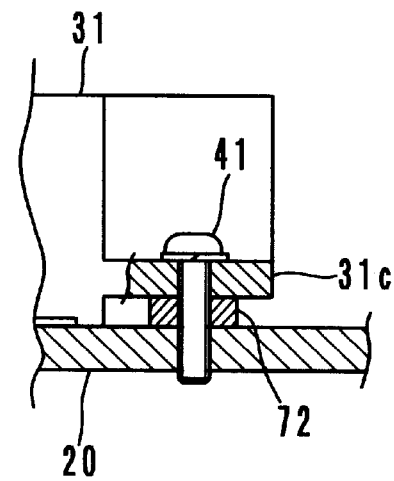
FIG. 16 is a sectional view showing another example of the assembly structure of the base block to the housing.
Figure 17:
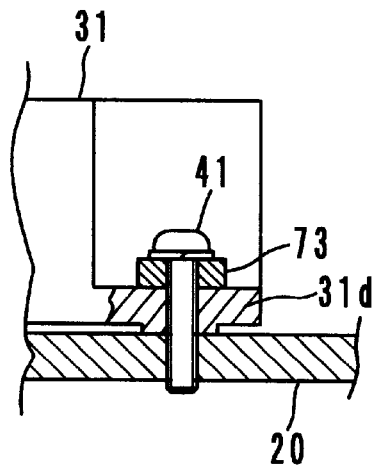
FIG. 17 is a sectional view showing further another example of the assembly structure of the base block to the housing.

Concretely, it is achieved, as shown in FIG. 15, by using shoulder bolts 41 and providing a compression spring 71 between the base block 31 and the head of each screw 41; as shown in FIG. 16, by forming projections 31c on the base block 31 and providing an elastic spacer 72 between the housing 20 and each of the projections 31c when tightening the screws 41 to screw the projections 31c to the housing 20; or as shown in FIG. 17, by providing an elastic spacer 73 between the head of each screw 41 and each projection 31d of the base block 31.

Figure 18:
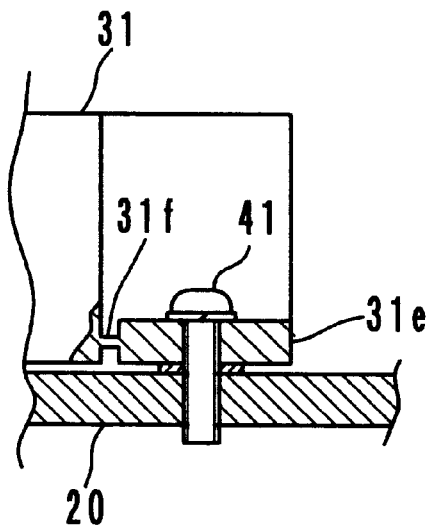
FIG. 18 is a sectional view showing further another example of the assembly structure of the base block to the housing.
Figure 19:
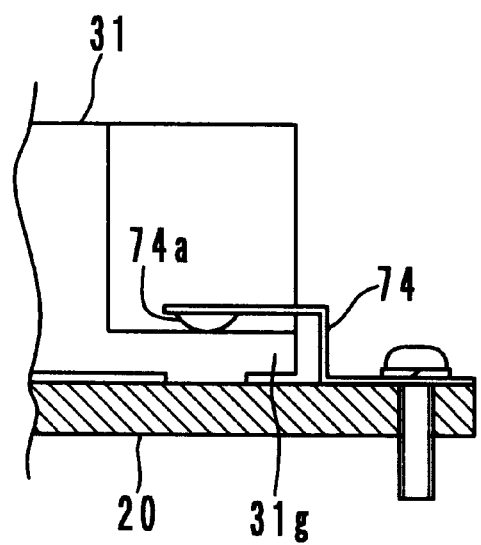
FIG. 19 is a sectional view showing further another example of the assembly structure of the base block to the housing.

Further, it can be achieved, as shown in FIG. 18, by forming a projections 31e via elastic thin wall portions 31f on the base block 31 and fastening the projections 31e with the screws 41; or as shown in FIG. 19, by forming projections 31g on the base block 31, screwing plate springs 74 on the housing 20 and pressing the projections 31g of the base block 31 elastically with end projecting parts 74a of the plate springs 74.

Figure 20:
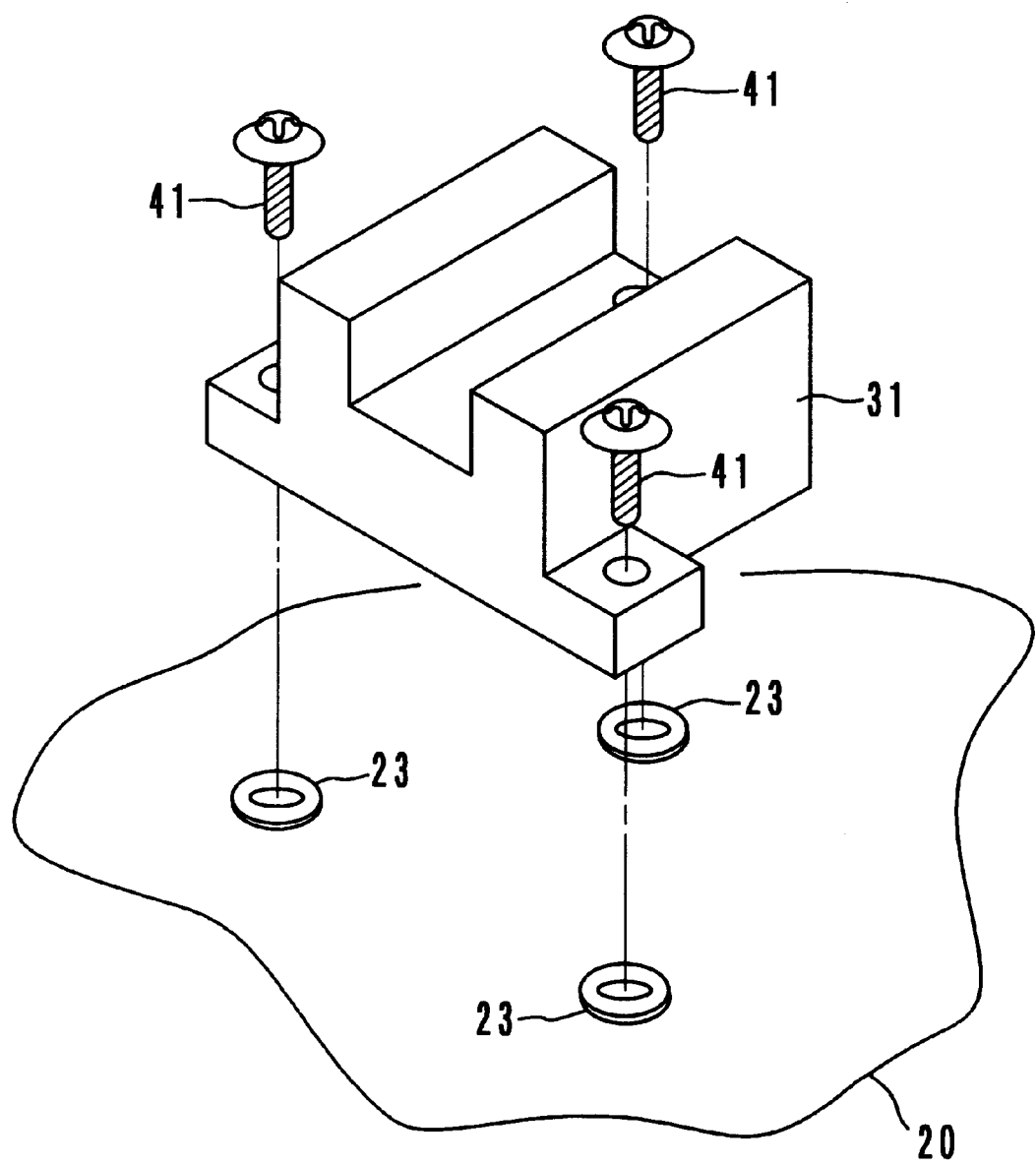
FIG. 20 is a perspective view showing an example of the structure of three-point suspension of the base block.

When screwing the base block 31 to the housing 20, a way of fastening and supporting on three points as shown in FIG. 20 is superior in stability to a way of fastening on four points. In FIG. 20, 23 are bearing surfaces which are formed on the housing 20 corresponding to the fastening points of the screws 41.

Figure 21:
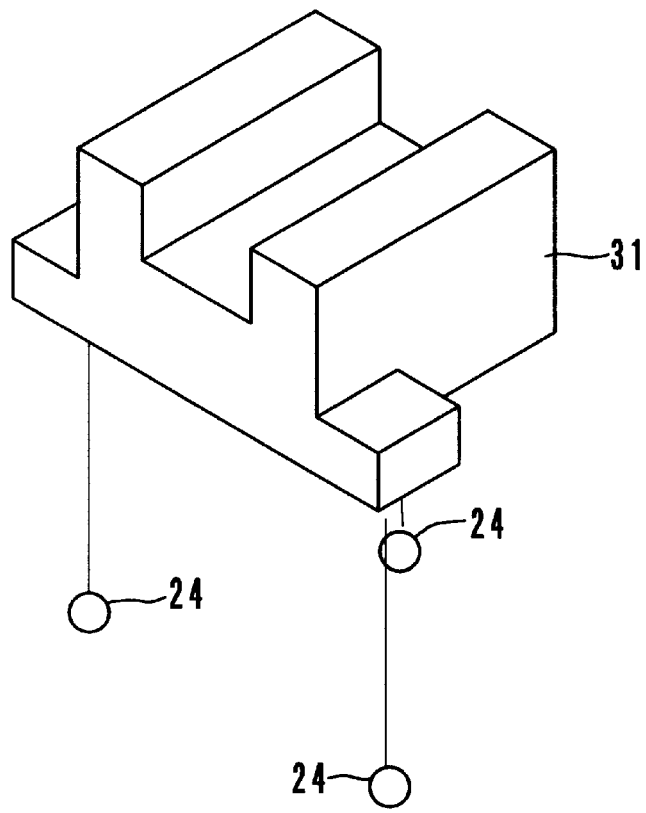
FIG. 21 is a perspective view showing another example of the structure of three-point suspension of the base block.
Figure 22:
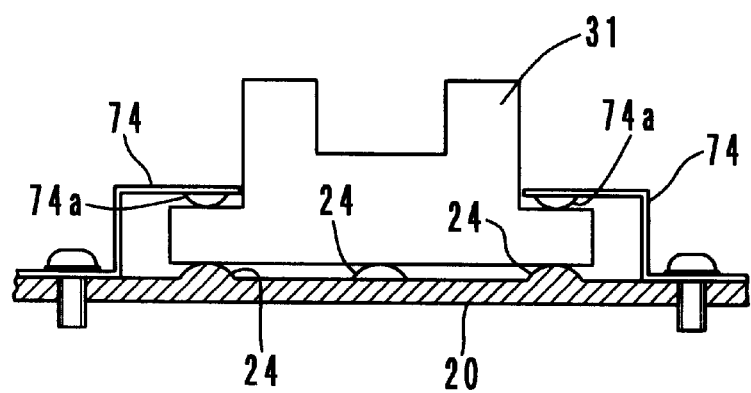
FIG. 22 is a partial sectional view of the assembly structure of FIG. 21.

FIGS. 21 and 22 show another example of assembling structure employing the three-point pressure/suspension. They show a structure where the base block 31 is pressed on three points by the end projecting parts 74a of the plate springs 74 to be assembled on the housing 20. On the housing 20, semi-spherical projections 24 are formed as bearing surfaces.

(Pressing power to base block and its amount of distortion)

Hereinafter, pressing power to the base block 31 and the amount of distortion caused thereby will be studied.

Figure 23A:
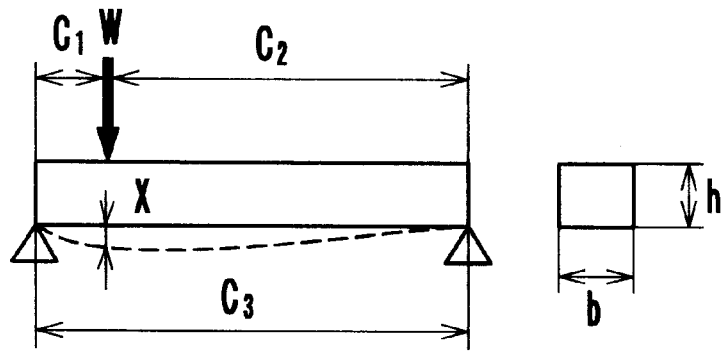
FIGS. 23a and 23b are illustrations showing relationship between the pressing power against the base block and the amount of distortion.
Figure 23B:
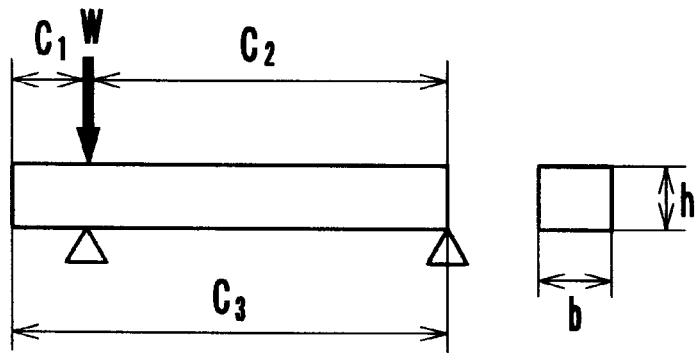

FIGS. 23a and 23b show a simplified model of the base block 31. In the model shown in FIG. 23a, the base block 31 appears as a columnar member with cross section of b×h having a length of $C_3$. It is supported at the both ends, and a load W is applied on a point at a distance of $C_1$ from one end and at a distance of $C_2$ from the other end. The amount of distortion X caused thereby will be studied. FIG. 23b shows an arrangement where the said columnar member is supported at a point directly below the loading point; in this case, distortion does not occur.

In the model of FIG. 23a, the amount of distortion is found by the expression below.

$$X = (W \cdot C_1^2 \cdot C_2^2)/(3 \cdot E \cdot I \cdot C_3^2)$$

W is load, E is Young's modulus, and $I = b \cdot h^3/12$

On the assumption that the amount of a change of relative positions of the image points of light beams is as ten times as the amount of a change of relative positions of the laser diodes 2 and 3 as light sources and that the allowable range of the amount of dislocation of two light beams $B_1$ and $B_2$ is 6 μm, the amount of distortion has to be limited under 0.6 μm.

On the assumption that b=2, h=0.675, I=0.051258, E=750000, $C_1$=0.8, $C_2$=4 and $C_3$=4.8, when applying a load W of 100 kgf, for example, the amount of distortion X measures 3.853673 μm; that is far above the allowable value of 0.6 μm. When applying a load W of 2.2 kgf, the amount of distortion X measures 0.084781 μm; this load or thereabout is the minimum value. And when applying a load W of 15 kgf, the amount of distortion X measures 0.578051 μm; this load or thereabout is the maximum value.

Now, on the assumption that b is 0.8 and that the values of the others are the same as those of the example set forth, except I is 0.020503 calculated thereby, when applying a load W of 100 kgf, the amount of distortion X measures 9.634183 μm; that is far above the allowable value of 0.6 μm. When applying a load W of 2.2 kgf, the amount of distortion X measures 0.211952 μm; this load or thereabout is the minimum value. And when applying a load W of 12.5 kgf, the amount of distortion X measures 0.58737 μm; this load or thereabout is the maximum value.

(Frictional force between base block and retainer block)

In such a structure of the present embodiment where the laser diodes 2 and 3 are assembled on the retainer blocks 32 and 33 respectively and said retainer blocks 32 and 33 are jointed with the base blocks 31 and 50 with the screws 45 and 46, it is required that the frictional force of the contact surface of the retainer blocks 32 and 33 and the screws 45 and 46 is small enough against that of the base blocks 31 and 50 and the retainer blocks 32 and 33.

It is now explained with the relationship of the base block 31 and the retainer block 32 as an example. In a structure where the retainer block 32 is jointed with the base block 31 with the screws 45, when the residual stress produced at the time of jointing is released, the retainer block 32 is dislocated against the base block 31. This dislocation leads the laser diode 2 fixed on the retainer block 32 to be dislocated and causes a shift of the image point.

It is known as a prior art which can prevent such a problem that, as disclosed in Japanese Patent Laid-open Publication No. 6-160745, either surface of the retaining member and the frame is finished so as to reduce the frictional force or is roughened so as to increase the frictional force. However, if the frictional force is reduced, the retaining member will easily move against the frame, which makes it hard to fine-adjust and fix the position of the light source, and even if the frictional force is increased, the stress itself will not be lowered, thus dislocation of the retaining member caused by a change of circumstance temperature or the like is not avoidable.

Accordingly, in order to make the retaining block be fine-adjustable and dislocation-protective, it is necessary that the stress itself is prevented, and the frictional force is so set that the dislocation will not happen even when the stress remains. The residual stress is produced at the time of jointing in the following way: in a case of jointing with a screw for example, a torque (torsional moment) arises, other than the pressure, between the head of the screw (including the washer) and the retainer block by the rotation of the screw, and such stress remains on the retaining block.

Figure 24:
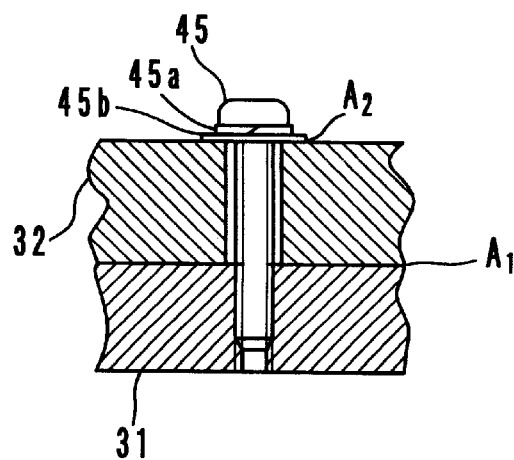
FIG. 24 is a sectional view showing an example of the fixing structure of a retainer block on the base block.

Accordingly, the embodiment of the present invention employs an arrangement where, as shown in FIG. 24, the frictional force of a contact surface $A_1$ of the base block 31 and the retainer block 32 is set big, and with providing washers 45a and 45b between the retainer block 32 and the head of each screw 45, the frictional force of a contact surface $A_2$ of the retainer block 32 and the washer 45b is set small. These members 31, 32, 45, 45a and 45b are made of aluminum. Making the frictional force of the contact surface $A_1$ big is achieved by making at least either surface be a roughened surface (blast processing or the like). And making the frictional force of the contact surface $A_2$ small is achieved by polishing the top surface of the retainer block 32 to be a smoothened surface or applying a lubricant between the top surface of the retainer block 32 and the washer 45b.

Concretely, the coefficient of friction of aluminum is 1.0 to 1.2 although it differs depending on conditions of surface finish, however, when casted, the surface roughness of aluminum will be quite uneven. The surface roughness of cutting surface will be less than 3 $\mu$m, that of die-casting surface will be less than 10 $\mu$m, and that of blasting surface will be 10 to 15 $\mu$m. It can be regarded that the coefficient of friction is proportional to the surface roughness and the coefficient of blasting surface is approximately 3 to 5 times as that of cutting surface. Therefore, the ratio of frictional force of the contact surfaces $A_1$ and $A_2$ is set 3:1 to 5:1.

As explained above, with the frictional force of the contact surface $A_2$ of the retainer block 32 and the jointing member set small enough, the contact surface $A_2$ receives only pressing power of the screws 45 in the direction of its axis (direction perpendicular to the interface), and a residual stress caused by torque can be limited quite small. At the same time, with the frictional force of the contact surface $A_1$ of the base block 31 and the retainer block 32 set rather big, relative movement between each other can be prevented, and positional adjustment for the laser diode 2 can be carried out easily and precisely with the relationship of both frictional forces. Further, even if a residual stress is produced at the time of jointing, since the frictional force of the contact surface $A_1$ has been so set as to withstand the residual stress, a stress will not be released on the interface. Consequently, dislocation of the laser diode 2 caused by a change in temperature, oscillation or the like will be prevented.

The above explanation which is on the basis of the relationship between the base block 31 and the retainer block 32 can be applied in the same way to the relationship between the base block 50 and the retainer block 33.

(Material for base block, retainer block and jointing member)

Figure 25:
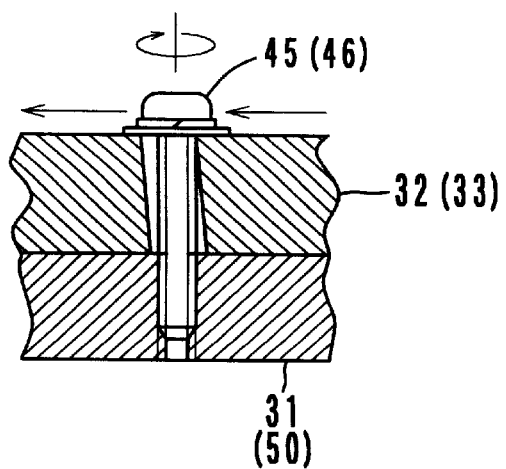
FIG. 25 is a sectional view explaining distortion of the retainer block.

It is preferable to use the same material for the base blocks 31 and 50, the retainer blocks 32 and 33, and the screws 45 and 46. At the time of jointing the retainer blocks 32 and 33 with the base blocks 31 and 50 by the screws 45 and 46, stress distortion arises between the retainer blocks 32 and 33 and the screws 45 and 46 as shown in FIG. 25, which leads the retainer blocks 32 and 33 to be distorted. Then, when said stress distortion is released by heat contraction of the members, the laser diodes 2 and 3 are dislocated together with the retainer blocks 32 and 33.

For example, if the base blocks 32 and 33 made of aluminum are jointed by the screws 45 and 46 made of iron, the retainer blocks 32 and 33 are fixed as distorted as shown in FIG. 25. Since positional adjustment of the laser diodes 2 and 3 are done in this condition, it is preferable that the retainer blocks 32 and 33 are kept in this distorted condition. Such distorted condition of the retainer blocks 32 and 33 are kept by the balance of pressure contacting force and frictional force between the retainer blocks 32 and 33 and the screws 45 and 46. However, when a change in temperature happens, the pressure contacting force between the screws 45 and 46 and the retainer blocks 32 and 33 changes (declines) because of the difference between the coefficient of thermal expansion of iron and that of aluminum, and the retainer blocks 32 and 33 have tendency to return to the original state without distortion; which appears as shifts of the image points of the laser diodes 2 and 3.

Such shifts of the image points are considerably small; however in a 2-beam method such as this embodiment, it is not ignorable because a change of one tenth or thereabout of the image point pitch is the allowable amount of change of the laser diodes 2 and 3 as a light sources.

Accordingly, with making the base blocks 31 and 50, the retainer blocks 32 and 33, and the screws 45 and 46 of same material (aluminum, for example), even if the temperature changes, the pressure contacting force between the retainer blocks 32 and 33 and the screws 45 and 46 will not change (decline) since these members have the same coefficient of thermal expansion. Therefore, fluctuation of the image point pitch of the laser diodes 2 and 3 is prevented.

Figure 26:
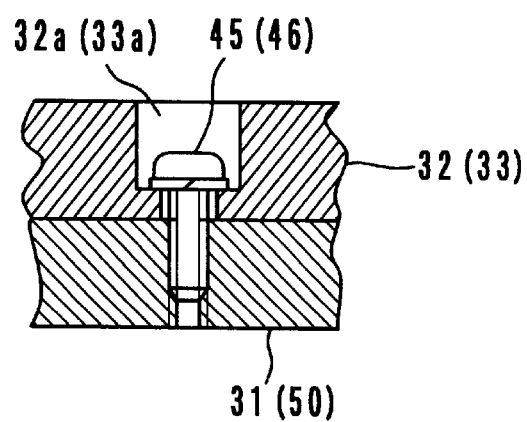
FIG. 26 is a sectional view showing another example of the fixing structure of the retainer block on the base block.

Further, as shown in FIG. 26, by forming counterbores 32a and 33a on the retainer blocks 32 and 33 and positioning the head of the screws 45 and 46 thereon, deformation of the retainer blocks 32 and 33 can be avoided to the utmost.

(Other embodiments)

In the above embodiment, as the element for combining the laser beams emitted from the two laser diodes 2 and 3, there may be adopted one in which a flat plate having a non-deflecting half-mirror surface and a flat plate having a filter mirror surface with a deflection characteristic are combined instead of the beam splitter 4 in which the prisms are combined.

Further, it is acceptable to provide collimator lenses in immediately front of each of the laser diodes 2 and 3 instead of the collimator lens 5; and the light beams collimated by the collimator lenses enter the beam splitter 4.

Furthermore, as indicated by two-dot chain lines in FIG. 2, it is acceptable to provide another multi-beam type light source unit 1' and make light beams emitted therefrom incident to the polygon mirror 12 by a beam splitter 6. In this case, the light source unit 1 or 1' is selected as switched to be driven. For example, the light source unit 1 has a pixel density of 400 dpi while the light source unit 1' has a pixel density of 600 dpi.

It is to be noted that the light beam scanning optical apparatus of the present invention is not limited to the aforementioned embodiment, and it can be altered in various ways within the scope of the invention.

What is claimed is:

1. A light beam scanning optical apparatus comprising:

a plurality of light sources which emit a plurality of light beams;

an optical element having an optical functional surface which leads the light beams emitted from the light sources to emerge therefrom with their light axes being parallel to each other;

a supporting member which supports the optical element at a surface of the optical element including the optical fuctional surface;

a lens unit which converts a plurality of light beams emitted from the plurality of light sources into parallel bundles of rays or convergent bundles of rays;

a deflector which deflects a plurality of light beams emitted from the lens unit simultaneously; and an imaging unit which images the deflected plurality of light beams on a light-receiving surface.

2. A light beam scanning optical apparatus as claimed in claim 1, wherein a gap is provided between the optical element and the closest non-supporting surface of the supporting member.

3. A light beam scanning optical apparatus as claimed in claim 1, wherein the optical element comprises two columnar prisms of different side lengths which are integrated together at the optical functional surface.

4. A light beam scanning optical apparatus as claimed in claim 1, wherein the plurality of light beams emitted from the optical element are apart from each other in a sub-scanning direction perpendicular to a main scanning direction in which the plurality of light beams are deflected by the deflector.

5. A light beam scanning apparatus as claimed in claim 1, wherein the supporting member supports the optical element at a plane surface thereof including the optical functional surface.

6. A light beam scanning optical apparatus as claimed in claim 1, wherein the supporting member has projecting supporting parts which support the optical element at a surface thereof including the optical functional surface at three points.

7. A light beam scanning optical apparatus as claimed in claim 6, wherein the surface including the optical functional surface is urged elastically against the projecting supporting parts.

8. A light beam scanning optical apparatus as claimed in claim 6, wherein the projecting supporting parts are semi-spherical.

9. A light source device comprising:

a plurality of light sources which emit a plurality of light beams;

an optical element having an optical functional surface including an optical thin layer which leads the light beams emitted from the light sources to emerge therefrom with their light axes being parallel to each other, the optical element comprises two columnar prisms of different side lengths which are integrated together at the optical functional surface; and a supporting member which supports the optical element at a plane surface thereof including the optical functional surface, the supporting member supports the plane surface including the optical functional surface substantially at a point.

10. A light source device as claimed in claim 9, wherein the supporting member has projecting supporting parts supporting the plane surface including the optical functional surface at a plurality of points.

11. A light source device as claimed in claim 10, wherein the plane surface including the optical functional surface is urged elastically against the projecting supporting parts.

12. A light source device as claimed in claim 10, wherein the projecting supporting parts are semi-spherical.

13. A light source device as claimed in claim 10, wherein the supporting member has three projecting supporting parts.

14. A light beam image writing apparatus comprising:

a plurality of light sources which emit a plurality of light beams;

an optical element having an optical functional surface which leads the light beams emitted from the light sources to emerge therefrom with their light axes being parallel to each other;

a supporting member which supports the optical element at a surface thereof including the optical functional surface;

a lens unit which converts a plurality of light beams emitted from the plurality of light sources into parallel bundles of rays or convergent bundles of rays;

a deflector which deflects a plurality of light beams emitted from the lens unit simultaneously;

an imaging unit which images the deflected plurality of light beams on a light-receiving surface; and a light-receiving surface upon which an image is written.

15. A light beam image writing apparatus as claimed in claim 14, wherein a gap is provided between the optical element and the closest non-supporting surface of the supporting member.

16. A light beam image writing apparatus as claimed in claim 14, wherein the optical element comprises two columnar prisms of different side lengths which are integrated together at the optical functional surface.

17. A light beam image writing apparatus as claimed in claim 14, wherein the supporting member has projecting supporting parts which support the optical element at a surface thereof including the optical functional surface at a plurality of points.

18. A light beam image writing apparatus as claimed in claim 17, wherein the surface including the optical functional surface is urged elastically against the projecting supporting parts.

19. A light beam image writing apparatus as claimed in claim 17, wherein the projecting supporting parts are semi-spherical.

20. A light beam image writing apparatus as claimed in claim 14, wherein the supporting member supports the optical element at a plane surface thereof including the optical functional surface.

* * * * *